Oct. 28, 1969 F. L. BISHOP ET AL 3,475,150
METHOD OF TEMPERING AND IMPARTING A PROTECTIVE
SCRATCH-RESISTANT COATING TO A GLASS ARTICLE
Filed June 9, 1966
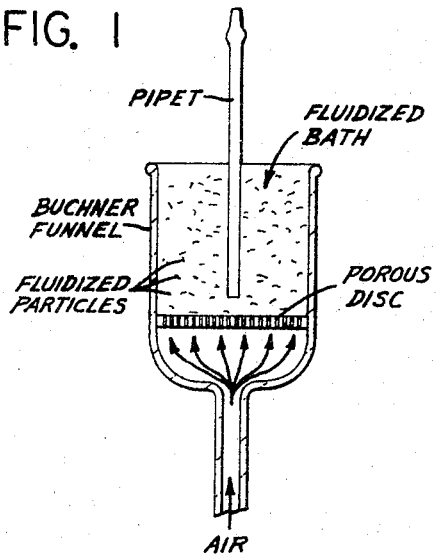
FIG. 1
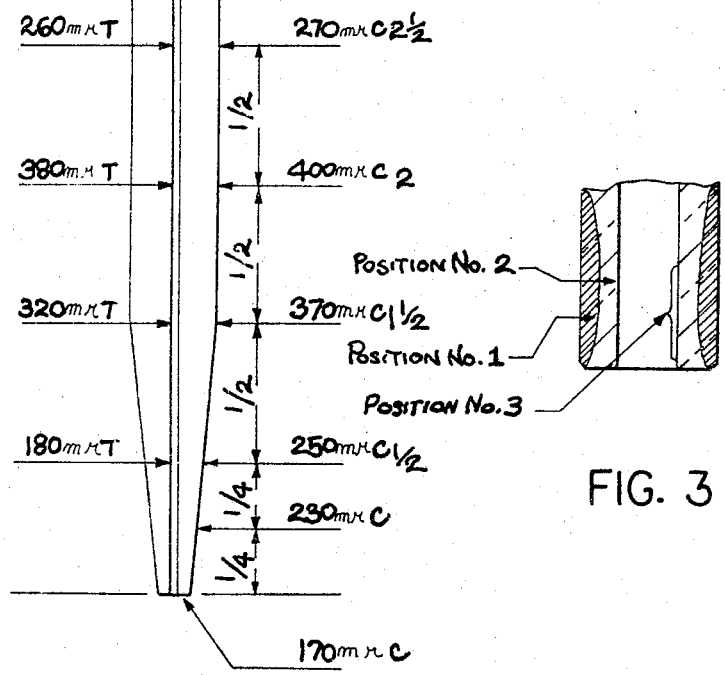
FIG. 2
FIG. 3
INVENTORS
Frederic L. Bishop
Eugene M. Cook
BY Jack M. Florence
Paul L. Sabatine
W. A. Schaich
ATTORNEYS

United States Patent Office 3,475,150
Patented Oct. 28, 1969

3,475,150
METHOD OF TEMPERING AND IMPARTING A PROTECTIVE SCRATCH-RESISTANT COATING TO A GLASS ARTICLE
Frederic L. Bishop, Eugene M. Cook, and Jack M. Florence, Toledo, Ohio, assignors to Owens-Illinois, Inc., a corporation of Ohio
Filed June 9, 1966, Ser. No. 556,388
Int. Cl. C03c 25/04
U.S. Cl. 65—60        11 Claims

ABSTRACT OF THE DISCLOSURE

A method of tempering the exterior surfaces of a glass article as well as the interior surfaces of a hollow or tubular glass article. The heated article is quenched in a fluidized bath of either airborne, heat transferable binary carbide particles, or glass beads with a metallic coating thereon. The interior surfaces are chilled by vacuum pulling the heat exchange media into the tubular interior of said articles. The particles or beads may be coated with a pyrolyzable metallic compound which surface coats the glass article to improve its scratch resistance.

---

This invention pertains to novel means for increasing the mechanical strength of glass. More particularly, the invention relates to a novel method of tempering glass articles of commerce by heating said glass to a temperature slightly less than its softening point temperature and then quickly quenching the glass in a heat exchange media at a markedly lower temperature to develop a compressive stress in the exterior or in the exterior and interior layers of said glass. A specific aspect of the invention relates to tempering glass and concurrently therewith surface coating said glass to improve its scratch resistance.

It is generally known that glass usually derives its mechanical strength from tempering and from having an unblemished surface, and is particularly strong when subjected to compressive stress. In the manufacture of certain kinds of glass items of commerce such as gage glasses, tableware, glass piping, plate glass, research ware, hospital ware and the like, it is often desirable and necessary to temper said glass to improve both its mechanical and thermal strengths. In the process of tempering, the glass is heated to raise its temperature to a temperature slightly less than its softening point temperature, then the glass is quickly cooled or quenched to produce compressive forces in the surface layers of the subject glass. Generally, during the quenching process of tubular glassware, such as a pipet, the exterior layers of the glass chill at a faster rate than the interior layer, and the former layer, therefore, quickly contracts and becomes rigid while the latter layer is still relatively fluid and expanded. As the glass nears a temperature equilibrium, the outside surfaces are under compression, and the inside surfaces are under tension.

It will be appreciated by those skilled in the art that a need exists for a variable means for tempering glassware. If a process for tempering is effected which makes possible the development of compressive stress either on the exterior or interior surfaces or on both the exterior and interior surfaces, said process would have a positive commercial use and represent an advancement in the instant art. Likewise, such a variable process would be especially useful and applicable in the fabrication of tubular articles where the exterior compressive stress could be balanced with the now developed interior compressive stress.

It will be further appreciated by those versed in the art that glass derives some of its strength from an unblemished surface which can be effected by coating the surface of said glass to improve its scratch resistance. If the novel tempering process of the invention can be joined with a process for coating glass articles, the simultaneous application of a combined process of tempering and surface coating to produce a glass article of commerce with imcreased strength would represent a valuable contribution to the art.

Accordingly, it is an object of this invention to provide a means for tempering glassware.

A further object of this invention is to provide a novel means for developing compressive stress adjacent the surfaces of glass bodies.

Yet a further object of the present invention is to fabricate a variable means for developing compressive stresses on the interior or exterior or on both the interior and exterior surfaces of glass bodies.

Yet another object of this invention is to impart to glass articles of commerce increased resistance to mechanically and thermally induced stress.

A still further object of the invention is to provide a means of simultaneously tempering and surface coating a glass item in a single operative process.

Yet a still further object of the invention is to provide coated particles for tempering glass wherein during said tempering process the volatile layer on said particle surface coats the glass item.

These and other objects, as well as aspects and advantages, will become apparent from a consideration of the accompanying disclosure, drawings, and the claims.

In the drawings,

FIGURE 1 represents a fluidized bath. Regulated air enters through the base of the bath and produces a fluid particle state quenching media.

FIGURE 2 depicts a pipet treated by the present process. The whole numbers correspond to locations where polariscopic optical retardation readings, recorded as $m\mu$ of tension or $m\mu$ of compression, were determined.

FIGURE 3 represents a cross section of a lip of a pipet. The position numbers identified as position Nos. 1 and 2 correspond to outside and inside bore locations used for polariscopic measurements. Position No. 3 relates to the general scratch testing area.

In attaining the objects and advantages of the invention, one feature resides in tempering a glass article, such as a pipet or the end of a pipet by first heating the pipet to about the softening point and then quenching the heated pipet by dipping it or its end in a fluidized bed, wherein silicon carbide, or a functionally equivalent carbide is employed as the heat transfer agent. The employment of silicon carbide, or a similar carbide like boron carbide, tungsten carbide or titanium carbide makes possible the novel feature of using a fluidized bed for quick cooling or quenching. Another unique tempering feature of the subject invention resides in the use of a fluidized bed consisting essentially of glass beads that may be plated with copper or silver. A metallic coated glass bead provides the desired degree of thermal conductivity needed for heat exchange to effect quenching or chilling of the previously heated glass article of commerce. The glass beads or particles employed for the purpose of the invention may be coated by known art processes such as hot dipped coatings which comprises dipping the particle into a molten metal bath, spraying wherein a molten metal is sprayed onto the particle, vapor deposition wherein metallic films can be deposited on the surface of a particle by condensation of the metal vapor and electroplating wherein the particles are placed in an electric field obtained by electrodes immersed in a solution of the desired metal to produce deposition of a coating on the particle.

In attaining the specific aspect of the instant invention, it has been unexpectedly found that the simultaneous application of tempering and surface coating of a glass article can be effected by mixing a volatile metallic compound with a heat transfer fluidized bed. The volatile metallic compound employed for coating the glass surface is generally a titanium or tin compound which pyrolyzes at about 700° F. to 1300° F. Among the compounds suitable for surface coating the glass item are titanium dioxide, $TiO_2$, stannous oxide, $SnO$, and stannic oxide, $SnO_2$. The volatile metallic compound may be mixed with the fluidized heat transfer material in various ways. For example, the volatile metallic compound may be mixed with the heat transfer material in the bed and will coat the heated article immersed, or the bed particles used for quenching may be coated with the pyrolyzable material to effect concurrent coating and quenching, or vapors produced from spraying a solution of the pyrolyzable metallic compound may be injected into the fluidized bed for the unique process of coating and quenching taking place at the same time.

The following examples are representative of the mode and manner of carrying out the instant invention and are not to be construed as limiting the invention, as these and other means will be apparent to those versed in the art from the instant disclosure and claims.

EXAMPLE 1

A number of commercially-available borosilicate pipets were heated to 1362° F. for 15 minutes and quickly inserted into a fluidized bed of 240 mesh commercially available silicon carbide for approximately one minute. The fluidized bed consists of a Buchner funnel with a medium porosity fritted disc. A regulated air current entering the funnel tube of approximately 5 p.s.i. was established to blow upward through the finely ground silicon carbide held in the bowl of the funnel. The depth of the bed of silicon carbide was about one-half inch and the regulated air current gave a boiling like action to the silicon carbide. The hot end of a pipet was dipped quickly into the boiling bed of silicon carbide and slowly removed. Generally, about one minute will give a desirable degree of tempering. While air was employed in the instant example, it is to be understood that other suitable gases such as carbon dioxide may be employed herein. This tempering process was successful in putting a compressive layer on the outside of pipets.

EXAMPLE 2

A commercially available 0.1 ml. Kimax pipet was heated to about 1360° F. for 15 minutes and then quenched in the silicon carbide as described in Example 1. The pipet was made of borosilicate glass, and the glass had a softening point of 795° C. and an annealing point of 574° C. The stress, corresponding to the optical retardation readings, for the outside compressive stress and the inside bore tensile stress were measured by conventional polariscopic means and the readings obtained, expressed in millimicrons of tension or millimicrons of compressive stress, are recorded herein. The procedure for determining stress is well known to the art, for example see "Polariscope Examination of Glass Container Sections" in the Journal of the American Ceramic Society, vol. 27, No. 3, p. 87, 1944. The reading, expressed herein as compressive stress C, or as tensile stress T, for the pipet tip, and at a distance of ¼, ½, 1½, 2, and 2½ inches from the pipet tip were 170C, 230C, 250C, 370C, 400C, and 270C. The values obtained for the tensile stress of the inside bore of the same pipet and recorded at the ¼, ½, 1½, 2, and 2½ inch intervals were 180T, 320T, 380T and 260T. These readings are also recorded on FIGURE 2. In the present case, C and T refer to the optical retardation readings for compression and tension.

EXAMPLE 3

A commercially avilable 0.1 ml. serological Kimax borosilicate pipet that was not tempered by the subject fluidized bed technique was subjected to polariscopic examination and the values obtained at the pipet tip, and at ¼ and ½ inch measured points from the tip of said pipet were 80C, 100C, and 50C. The tension values for the inside bore at the ¼ and ½ inch levels were 80T, and 30T. It can be observed from these values, that the fluidized bed tempered pipet as prepared according to Example 2, exhibited a heavier layer of outside compressive stress extending from the tip of the point of the pipet upward than did the pipet of this Example 3.

EXAMPLE 4

A number of 2 ml. Kimax borosilicate pipets were tempered in the fluidized bath described in Example 1, after heating the pipet for 15 minutes at 1350° F. The pipets were quenched as above and optical retardation readings, indicative of stress, were made with a polarimeter. The stress measurements were made at a point immediately near the lip or top of the pipet. The results are reported in Table I, below. Pipets No. 1 to 5 were tempered, pipet No. 6 was not tempered. The stress results appearing in Table I are reported in millimicrons.

TABLE I

| Pipet Number: | Outside Stress | Inside Stress |
|---|---|---|
| 1 | 590C | 420T |
| 2 | 580C | 400T |
| 3 | 680C | 410T |
| 4 | 690C | 240T |
| 5 | 450C | 100T |
| 6 | 50C | 300T |

EXAMPLE 5

A 2 ml. pipet, Kimax borosilicate, was heated to 1250° F. and held at this temperature for 15 minutes. The heated lip or top of the pipet was then quickly plunged into a fluidized glass bead bed. The fluidized glass bead bed consists of a commercially available Buchner funnel with a medium porosity fritted disc. The beads in the funnel were about ½ inch deep. A line regulated moderate air current was effected to produce a boiling like action in the fluidized bead bed. The heated pipet was plunged into said bed and kept there for about 1 minute. The compressive stress and tensile stress was measured for the tempered pipet as in Example 4, and the values were 80C, and 120T.

EXAMPLE 6

A pipet, 2 ml. Kimax, of borosilicate glass, was heated in a glass bead bed as in Example 5, except that the instant bed contained a surface coating agent, tetraisopropyltitanate. All other conditions were as above described. The compression and tension values for the pipet treated in the present bed were 90C and 110T. In addition, when the treated pipet was scratched, it did not break while a comparable tempered, non-coated pipet broke immediately when scratched.

EXAMPLE 7

Four pipets, an 0.1 ml., a 10 ml., and two 1.0 ml., were processed according to the vacuum tempering process of the present invention. This method of tempering was to heat the pipet to 740° C. for 12½ minutes and insert the heated pipet into a fluidized bed of silicon carbide for varying times. The vacuum was applied to the bore of the tip of the pipet for about 1 minute for the 0.1 ml. pipet, 8 seconds for the 10 ml. pipet, and for the two 1.0 ml. pipets, 1 minute and 7 seconds, respectively. The use of the vacuum technique to cool the inner bore at an increased rate to create a compressive stress to balance the stress on the exterior surface of the pipet by pulling silicon carbide through the bore of the pipet was found to create the desired compressive stress pattern.

The novel process of the present invention can be used for tempering glass items of commerce such as laboratory glassware, instrument glass, water gauge glass, glass piping, flat glass and the like.

While the illustrative embodiments of the invention have been described with particularity, it will be understood that various modifications will be apparent and can readily be made by those skilled in the art without departing from the scope and spirit of the invention.

We claim:

1. A method of tempering and imparting a protective scratch-resistant coating to a glass article wherein said method comprises heating said glass to a temperature between its strain point and its softening point and quenching and coating said heated article in a fluidized gaseous bath consisting of airborne heat transferable binary carbide particles together with an airborne pyrolyzable coating compound selected from the group consisting of tin and titanium compounds.

2. A method according to claim 1 wherein said pyrolyzable compound is selected from the group consisting of titanium dioxide, tetraisopropyl titanate, stannous chloride, and stannic chloride.

3. A method as defined in claim 1, wherein said binary carbide particles are particles of at least one of the group of binary carbide compounds consisting of silicon carbide, boron carbide, tungsten carbide, and titanium carbide.

4. A method of tempering both the inside and outside surfaces of a tubular glass article comprising the steps of heating said glass article to a temperature slightly less than its softening point temperature; chilling the so heated outside surface of said glass article by immersing same in a lower temperature fluidized bath of airborne heat-transferable binary carbide particles thereby causing said carbide particles to impinge against and chill said outside surface; chilling the so heated inside surface of said glass article by vacuum pulling said binary carbide particles into the tubular interior confines of said glass article to impinge against and chill said inside surface; and thereby tempering both said inside and outside surfaces of said glass article.

5. A method as defined in claim 4, wherein said binary carbide particles are particles of at least one of the group of binary carbide compounds consisting of silicon carbide, boron carbide, tungsten carbide, and titanium carbide.

6. A method of tempering and imparting a protective scratch-resistant coating to both the inside and outside surfaces of a tubular glass article comprising the steps of heating said glass article to a temperature slightly less than its softening point temperature and chilling said glass article by immersing same in a lower temperature fluidized bath of airborne, heat-transferable binary carbide particles coated with a pyrolyzable, metalliferous compound selected from at least one of the group of pyrolyzable metalliferous compounds consisting of titanium dioxide, tetraisopropyl titanate, stannous chloride, and stannic chloride, thereby causing said binary carbide particles to impinge against and chill said outside surface; and chilling said inside surface by vacuum pulling said binary carbide particles into the tubular interior confines of said glass article, thereby causing said binary carbide particles to impinge against and chill said inside surface; and thereby tempering and coating both said inside and outside surfaces of said tubular glass article.

7. A method of tempering the inside surface of a tubular glass article comprising the steps of heating said inside glass surface to a temperature slightly less than the softening point temperature of the glass at said inside surface; chilling said inside surface by vacuum pulling into the tubular interior confines of said glass article a fluidized bath of gasborne, heat-transferable binary carbide particles selected from the group of binary carbide compounds consisting of silicon carbide, boron carbide, tungsten carbide, and titanium carbide, thereby causing said binary carbide particles to impinge against and chill said inside surface; and thereby tempering said inside surface of said tubular glass article.

8. A method of tempering and imparting a protective scratch-resistant coating to the inside surface of a tubular glass article comprising the steps of heating said inside glass surface to a temperature slightly less than the softening point temperature of the glass at said inside surface; chilling said inside surface by vacuum pulling into the tubular interior confines of said glass article a fluidized bath of gasborne, heat-transferable binary carbide particles coated with a pyrolyzable metallic compound selected from at least one of the group of pyrolyzable metallic compounds consisting of titanium dioxide, tetraisopropyl titanate, stannous chloride, and stannic chloride, thereby causing said binary carbide particles to impinge against and chill said inside surface; and thereby tempering and coating said inside surface of said tubular glass article.

9. A method as defined in claim 8, wherein said binary carbide particles are particles selected from at least one of the group of binary carbide compounds consisting of silicon carbide, boron carbide, tungsten carbide, and titanium carbide.

10. A method of increasing the strength of a glass article comprising the steps of heating said glass article to a temperature near its softening point, and chilling said glass article while so heated in a fluidized bath of glass beads suspended in a fluid medium and having a metallic coating thereon selected from at least one of the group consisting of copper and silver.

11. A method according to claim 10 wherein said bath contains a pyrolyzable compound for increasing the strength of the glass article by imparting a protective scratch-resistant coating to the article and where the pyrolyzable compound is selected from the group consisting of titanium dioxide, tetraisopropyl titanate, stannous chloride and stannic chloride, and wherein the coating is imparted onto the glass article by immersing the heated glass article into the bath to strengthen said glass article.

References Cited
UNITED STATES PATENTS

| | | | |
|---|---|---|---|
| 2,971,242 | 2/1961 | Doleman et al. | 34—95 XR |
| 3,051,593 | 8/1962 | Gray et al. | |
| 3,093,508 | 6/1963 | Wartenberg | 65—60 XR |
| 3,242,973 | 3/1966 | Neale et al. | 165—104 XR |

S. LEON BASHORE, Primary Examiner

SAUL R. FRIEDMAN, Assistant Examiner

U.S. Cl. X.R.

65—114; 117—124; 165—1, 104